United States Patent
Le Taillandier De Gabory et al.

(10) Patent No.: US 11,990,727 B2
(45) Date of Patent: May 21, 2024

(54) MONITORING APPARATUS FOR OPTICAL AMPLIFIER, OPTICAL AMPLIFYING SYSTEM, AND METHOD OF MONITORING AMPLIFIED OPTICAL SIGNAL

(71) Applicant: NEC Corporation, Tokyo (JP)

(72) Inventors: Emmanuel Le Taillandier De Gabory, Tokyo (JP); Keiichi Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 791 days.

(21) Appl. No.: 16/978,460

(22) PCT Filed: Mar. 7, 2018

(86) PCT No.: PCT/JP2018/008713
§ 371 (c)(1),
(2) Date: Sep. 4, 2020

(87) PCT Pub. No.: WO2019/171484
PCT Pub. Date: Sep. 12, 2019

(65) Prior Publication Data
US 2021/0044077 A1 Feb. 11, 2021

(51) Int. Cl.
*H01S 3/13* (2006.01)
*H01S 3/067* (2006.01)
(Continued)

(52) U.S. Cl.
CPC ........ *H01S 3/1301* (2013.01); *H01S 3/06737* (2013.01); *H01S 3/06754* (2013.01);
(Continued)

(58) Field of Classification Search
CPC ............ H01S 3/06754; H01S 3/06762; H01S 3/1301; H01S 3/1305
See application file for complete search history.

(56) References Cited

U.S. PATENT DOCUMENTS 5,828,486 A * 10/1998 Yoshida .............. H01S 3/13013
398/92
5,861,980 A 1/1999 Ono
(Continued)

FOREIGN PATENT DOCUMENTS

DE 19830809 A1 * 6/1999 ................ G01J 3/36
EP 0415438 A2 3/1991
(Continued)

OTHER PUBLICATIONS

Japanese Office Action for JP Application No. 2020-545394 dated Aug. 17, 2021 with English Translation.
(Continued)

*Primary Examiner* — Eric L Bolda

(57) ABSTRACT

It is difficult to flatten the gain profile of an optical amplifier without increasing the power consumption, the cost, and the size of the optical amplifier; therefore, a monitoring apparatus for optical amplifier according to an exemplary aspect of the invention includes an optical filtering means for receiving a monitor light beam of the optical amplifier and transmitting a filtered monitor light beam with a set range of wavelength band; a photoelectric conversion means for converting the filtered monitor light beam into a monitoring signal; and a spectrum information generating means for generating spectrum information based on the monitoring signal, the spectrum information including information on a spectrum profile of output of the optical amplifier.

15 Claims, 9 Drawing Sheets

(51) Int. Cl.
  *H01S 3/094* (2006.01)
  *H01S 3/10* (2006.01)
  *H01S 3/23* (2006.01)
  *H04B 10/25* (2013.01)
  *H04B 10/294* (2013.01)
  *H04B 10/572* (2013.01)
  *H04B 10/66* (2013.01)
  *H04J 14/02* (2006.01)

(52) U.S. Cl.
  CPC .. *H01S 3/094007* (2013.01); *H01S 3/094069* (2013.01); *H01S 3/10015* (2013.01); *H01S 3/1003* (2013.01); *H01S 3/1305* (2013.01); *H01S 3/2391* (2013.01); *H04B 10/25* (2013.01); *H04B 10/2942* (2013.01); *H04B 10/572* (2013.01); *H04B 10/66* (2013.01); *H04J 14/02* (2013.01)

(56) References Cited

U.S. PATENT DOCUMENTS

| | | | | |
|---|---|---|---|---|
| 6,437,320 | B1* | 8/2002 | Yoshida | H01S 3/10013 250/214 AG |
| 6,483,631 | B1 | 11/2002 | Cheng et al. | |
| 6,690,505 | B1 | 2/2004 | Ye | |
| 6,785,042 | B1* | 8/2004 | Onaka | H01S 3/06758 359/334 |
| 2002/0191275 | A1 | 12/2002 | Kinoshita et al. | |
| 2005/0128467 | A1 | 6/2005 | Komaki | |
| 2015/0009555 | A1* | 1/2015 | Takahashi | H01S 3/10023 359/337.2 |
| 2015/0085352 | A1 | 3/2015 | Ryf et al. | |
| 2017/0212366 | A1* | 7/2017 | Banno | G02F 1/2257 |

FOREIGN PATENT DOCUMENTS

| | | |
|---|---|---|
| EP | 0930677 A2 | 7/1999 |
| JP | H03-087727 A | 4/1991 |
| JP | H09-083489 A | 3/1997 |
| JP | H10-051396 A | 2/1998 |
| JP | H11-205242 A | 7/1999 |
| JP | 2000-078081 A | 3/2000 |
| JP | 2005-175272 A | 6/2005 |
| JP | 2006-286918 A | 10/2006 |
| JP | 2007-115900 A | 5/2007 |
| JP | 2016-219753 A | 12/2016 |
| WO | 2016/042658 A1 | 3/2016 |

OTHER PUBLICATIONS

Extended European Search Report for EP Application No. EP18908496.5 dated Feb. 11, 2021.
Japanese Office Communication for JP Application No. 2020-545394 dated May 10, 2022 with English Translation.
International Search Report dated May 22, 2018, in corresponding PCT International Application.
Takahashi et al.; "First Demonstration of MC-EDFA-Repeatered SDM Transmission of 40×128-Gbit/s PDM-QPSK Signals per core over 6,160-km 7-core MCF", ECOC 2012, paper Th.3.C.3., vol. 21, No. 1, pp. 1-7 (2012).
Le Taillandier De Gabory et al.; "Transmission of 256Gb/s PM-16QAM Signal through 7-Core MCF and MC-EDFA with Common Cladding and Variable Shared Core Pumping for Reduction of Power Consumption", ECOC 2017, paper M.1.E.2, pp. 1-3 (2017).
Cho et al.; "Trans-Atlantic Field Trial Using Probabilistically Shaped 64-QAM at High Spectral Efficiencies and Single-Carrier Real-Time 250-GB/s 16-QAM", OFC 2017, paper Th5B.3, pp. 1-3 (2017).
Le Taillandier De Gabory et al.; "Transmission of 256Gb/s PM-16QAM Signal through Hybrid Cladding and Core Pumping Scheme MC-EDFA Controlled for Reduced Power Consumption", OFC 2017, paper Th1C.1, pp. 1-3 (2017).

* cited by examiner

MONITORING APPARATUS FOR OPTICAL AMPLIFIER, OPTICAL AMPLIFYING SYSTEM, AND METHOD OF MONITORING AMPLIFIED OPTICAL SIGNAL

CROSS-REFERENCE TO RELATED PATENT APPLICATIONS

This application is a National Stage Entry of International Application No. PCT/JP2018/008713, filed Mar. 7, 2018. The entire contents of the above-referenced application is expressly incorporated herein by reference.

TECHNICAL FIELD

The present invention relates to monitoring apparatuses for optical amplifiers, optical amplifying systems, and methods of monitoring amplified optical signal, in particular, to a monitoring apparatus for optical amplifier, an optical amplifying system, and a method of monitoring amplified optical signal that are used in wavelength division multiplexing systems.

BACKGROUND ART

In order to optimize the investment in optical fiber links, it is desirable to increase the capacity of the optical fiber links. This can be achieved by increasing the spectral efficiency (SE) of the signals to be transmitted through the optical fiber links.

A common way to achieve the increase in the SE is to use more efficient modulation formats for the information to be transmitted. This can be used in conjunction with the wavelength division multiplexing (WDM) system.

Furthermore, the space division multiplexing (SDM) system is being used in order to increase the capacity of transmission through a single fiber maintaining the possibility of the transmission over a long distance.

In Non Patent Literature 1 (NPL1), an SDM system is implemented with a multi core fiber (MCF), which consists of several cores conducting optical signals within the same fiber, and a multicore (MC) erbium doped fiber amplifier (EDFA), which consists in a fiber amplifier with an MCF serving as gain medium. The SDM system is used to transmit 40 wavelengths of 128 Gb/s polarization division multiplexed quadrature phase shift keying (PDM-QPSK) signal over 6,160 km 7-core MCF. The MC-EDFA consists in pumping individually the cores of a single MCF gain medium with separate pumps by scheme of direct core pumping. This system demonstration highlights the possibility to multiply the system capacity by the number of cores of MCF, namely 7 cores in NPL1. By using the MCF, it is possible to use the multiplicity of cores for spatially multiplexed signals in addition to WDM in each core, which increases the capacity of transmission through fibers without sacrificing the transmission distance.

Furthermore, different methods of amplifications can be used for MC-EDFA as with the individual core pumping (ICP) method. The different methods include a shared core pumping (SCP) method or a common cladding pumping (CCP) method, as illustrated in Non Patent Literature 2 (NPL2).

Several EDFAs can be mounted in the same place for a multitude of fiber pairs. Several cores of MC-EDFA can be pumped in the same apparatus.

Considering amplification of WDM signals, the shape, that is, the flatness of the gain of an EDFA depends on the input signal and control currents applied to the optical pumps used in the EDFA. In order to simplify the control and maintain the flatness over a long distance, where numerous EDFAs are used in cascade, automatic current control (ACC) method may be used. Indeed, the flatness of the gain is required in order to transmit optical signals with sufficient optical signal to noise ratio (OSNR) on the whole amplified spectrum.

However, the ACC method requires maintaining constant input power independently of the number of wavelengths for transmission. In order to maintain constant input power, it is a common practice in submarine transmission systems to load amplified spontaneous emission (ASE) onto the regions of the spectrum where no signal is transmitted, remove a load from the region where signal is inserted, and insert a load in the region where the signal is removed. An example of the ASE loading practice is given in Non Patent Literature 3 (NPL3).

In addition, an example of a low loss tunable equalizing filter is given in Non Patent Literature 4 (NPL4). A filter like this makes it possible to flatten the gain of an EDFA with low insertion loss, which results in small increase in the consumed power of the amplifier to compensate for the insertion loss.

CITATION LIST

Non Patent Literature

[NPL 1]
H. Takahashi et al., "First Demonstration of MC-EDFA-Repeatered SDM Transmission of 40×128-Gbit/s PDM-QPSK Signals per core over 6,160-km 7-core MCF", ECOC 2012, paper Th.3.C.3.

[NPL 2]
E. Le Taillandier de Gabory et al., "Transmission of 256 Gb/s PM-16QAM Signal through 7-Core MCF and MC-EDFA with Common Cladding and Variable Shared Core Pumping for Reduction of Power Consumption", ECOC 2017, paper M.1.E.2

[NPL 3]
J. Cho et al., "Trans-Atlantic Field Trial Using Probabilistically Shaped 64-QAM at High Spectral Efficiencies and Single-Carrier Real-Time 250-Gb/s 16-QAM", OFC 2017, paper Th5B.3

[NPL 4]
E. Le Taillandier de Gabory et al., "Transmission of 256 Gb/s PM-16QAM Signal through Hybrid Cladding and Core Pumping Scheme MC-EDFA Controlled for Reduced Power Consumption", OFC 2017, paper Th1C.1

SUMMARY OF INVENTION

Technical Problem

It is difficult to reduce the power consumption of a small-size and low-cost optical amplifier and achieve a flat gain for multiple EDFAs or MC-EDFA. Indeed, using the ACC method requires loading the ASE onto the spectrum region even where no signal is transmitted, as described in NPL3. Therefore, pump light is used for amplifying loaded noise, and its consumed power is not used for transmission of the signal, which reduces the efficiency of the system. Furthermore, using the ASE loading practice complicates the control of the systems where ROADMs (reconfigurable optical add and drop multiplexers) are used, because the signals loaded with the ASE have to be rerouted and split between branches.

Using low loss tunable equalization filters as described in NPL 4 is an attractive option, but it requires monitoring the spectrum. The large footprint and expensive price of an optical spectrum analyzer prohibit this solution to be used for controlling each amplifier of a long transmission line.

As mentioned above, there has been the problem that it is difficult to flatten the gain profile of an optical amplifier without increasing the power consumption, the cost, and the size of the optical amplifier.

An exemplary object of the invention is to provide a monitoring apparatus for optical amplifier, an optical amplifying system, and a method of monitoring amplified optical signal that solve the above-mentioned problem that it is difficult to flatten the gain profile of an optical amplifier without increasing the power consumption, the cost, and the size of the optical amplifier.

Solution to Problem

A monitoring apparatus for optical amplifier according to an exemplary aspect of the invention includes an optical filtering means for receiving a monitor light beam of the optical amplifier and transmitting a filtered monitor light beam with a set range of wavelength band; a photoelectric conversion means for converting the filtered monitor light beam into a monitoring signal; and a spectrum information generating means for generating spectrum information based on the monitoring signal, the spectrum information including information on a spectrum profile of output of the optical amplifier.

An optical amplifying system according to an exemplary aspect of the invention includes a monitoring means; and an optical amplifying means, wherein the monitoring means includes an optical filtering means for receiving a monitor light beam of the optical amplifying means and transmitting a filtered monitor light beam with a set range of wavelength band; a photoelectric conversion means for converting the filtered monitor light beam into a monitoring signal; and a spectrum information generating means for generating spectrum information based on the monitoring signal, the spectrum information including information on a spectrum profile of output of the optical amplifying means.

A method of monitoring amplified optical signal according to an exemplary aspect of the invention includes obtaining a monitor light beam being part of the amplified optical signal and generating a filtered monitor light beam with a set range of wavelength band; converting the filtered monitor light beam into a monitoring signal; and generating spectrum information based on the monitoring signal, the spectrum information including information on a spectrum profile of the amplified optical signal.

Advantageous Effects of Invention

An exemplary advantage according to the present invention is that it is possible to flatten the gain profile of an optical amplifier without increasing the power consumption, the cost, and the size of the optical amplifier.

DESCRIPTION OF EMBODIMENTS

Figure 1:
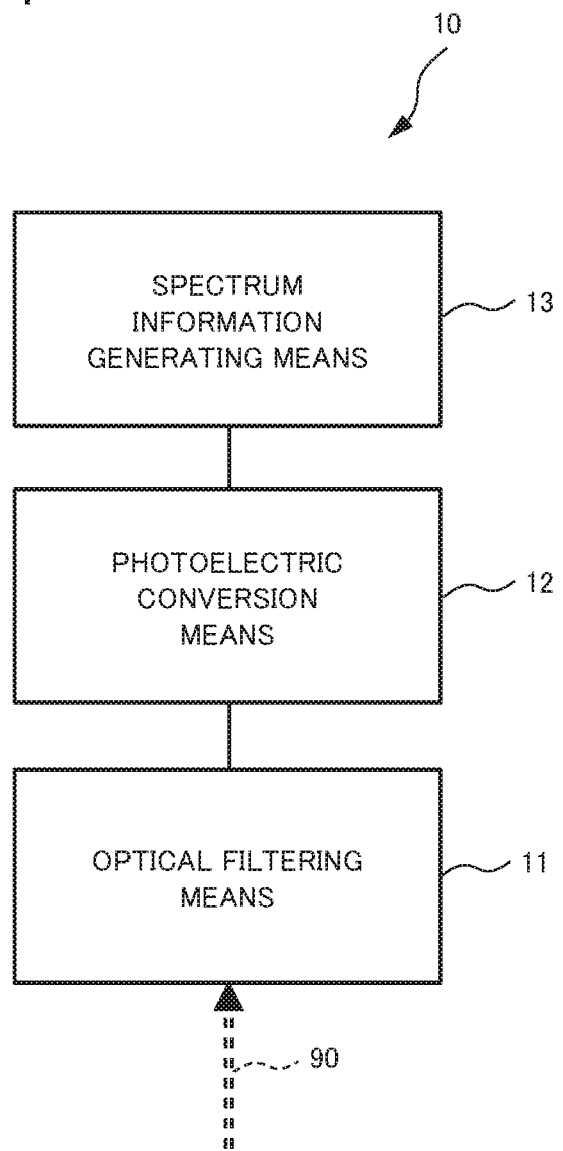
FIG. 1 is a block diagram illustrating the configuration of a monitoring apparatus for optical amplifier in accordance with a first example embodiment of the present invention.

The example embodiments of the present invention will be described with reference to drawings below. The arrow direction in the drawings denotes an example of direction and does not limit the direction of signals between blocks.

A First Example Embodiment

FIG. 1 is a block diagram illustrating the configuration of a monitoring apparatus for optical amplifier in accordance with a first example embodiment of the present invention. The monitoring apparatus for optical amplifier 10 includes an optical filtering means 11, a photoelectric conversion means 12, and a spectrum information generating means 13.

The optical filtering means 11 is configured to receive a monitor light beam 90 of the optical amplifier and transmit a filtered monitor light beam with a set range of wavelength band. The photoelectric conversion means 12 is configured to convert the filtered monitor light beam into a monitoring signal. The spectrum information generating means 13 is configured to generate spectrum information based on the monitoring signal, and the spectrum information includes information on a spectrum profile of output of the optical amplifier.

According to the monitoring apparatus for optical amplifier 10 of the present example embodiment, it is possible to obtain the information on a spectrum profile of the output of the optical amplifier in a simple configuration. This makes it possible to flatten the gain profile of an optical amplifier without increasing the power consumption, the cost, and the size of the optical amplifier.

The optical filtering means 11 may include a tunable optical filter whose center wavelength is tunable. And, the spectrum information generating means 13 can generate the spectrum information by scanning the center wavelength.

Alternatively, the optical filtering means 11 may include a plurality of optical bandpass filters, each of which has a different fixed center wavelength and a fixed passband, and transmit the filtered monitor light beam with respect to each passband. In this case, the photoelectric conversion means 12 can include a plurality of photodetectors, each of which converts the filtered monitor light beam with respect to each passband into the monitoring signal with respect to each passband. And, the spectrum information generating means 13 can generate the spectrum information based on the monitoring signal with respect to each passband.

In addition, the monitoring apparatus for optical amplifier 10 may include an optical combining means that is configured to receive a plurality of monitor light beams from the optical amplifier and transmit the monitor light beam 90 to the optical filtering means 11.

Next, an optical amplifying system in accordance with the present example embodiment will be described with reference to FIG. 2.

Figure 2:
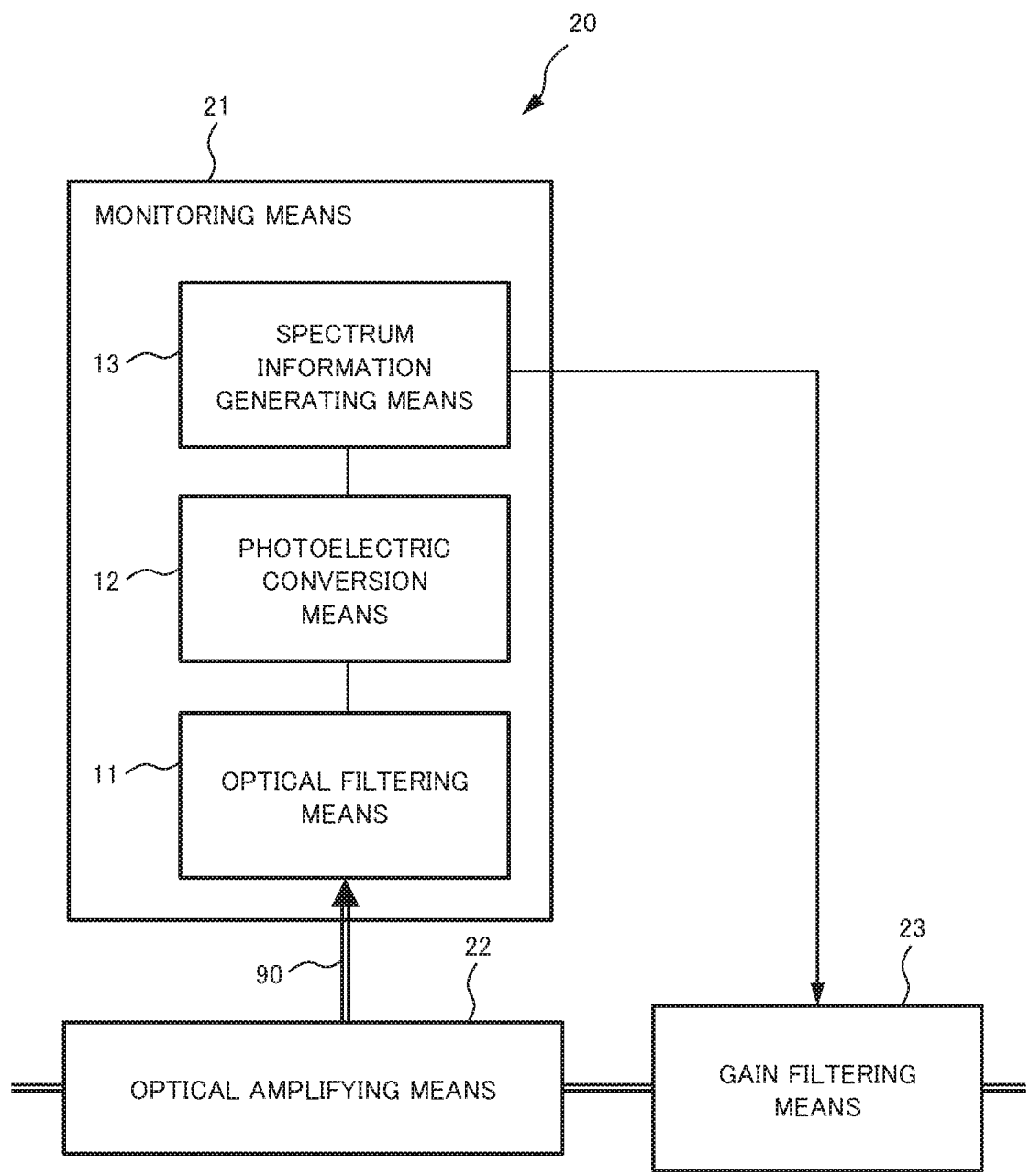
FIG. 2 is a block diagram illustrating the configuration of an optical amplifying system in accordance with the first example embodiment of the present invention.

As illustrated in FIG. 2, the optical amplifying system 20 includes a monitoring means 21 and an optical amplifying means 22. The monitoring means 21 has the same configuration as the above-described monitoring apparatus for optical amplifier 10; that is, the monitoring means 21 includes an optical filtering means 11, a photoelectric conversion means 12, and a spectrum information generating means 13.

In the monitoring means 21, the optical filtering means 11 receives a monitor light beam 90 of the optical amplifying means 22. The spectrum information generating means 13 generates spectrum information based on the monitoring signal, and the spectrum information includes information on a spectrum profile of output of the optical amplifying means 22.

In addition, the optical amplifying system 20 may include a gain filtering means 23 as illustrated in FIG. 2. The gain filtering means 23 is configured to equalize the spectrum profile based on the spectrum information.

Next, a method of monitoring amplified optical signal in accordance with the present example embodiment will be described.

In the method of monitoring amplified optical signal, first, a monitor light beam that is part of the amplified optical signal is obtained, and a filtered monitor light beam with a set range of wavelength band is generated.

Then the filtered monitor light beam is converted into a monitoring signal. Finally, spectrum information is generated based on the monitoring signal, and the spectrum information includes information on a spectrum profile of the amplified optical signal.

The generating of the spectrum information may include scanning a center wavelength of the wavelength band.

Alternatively, the generating of the filtered monitor light beam may include generating a plurality of filtered monitor light beams each of which having a different center wavelength and a passband. In this case, the converting of the filtered monitor light beam can include converting each of the plurality of filtered monitor light beams into the monitoring signal with respect to each passband. And, the generating of the spectrum information can include generating the spectrum information based on the monitoring signal with respect to each passband.

In addition, the method of monitoring amplified optical signal according to the present example embodiment may include combining a plurality of monitor light beams being part of the amplified optical signal and generating the monitor light beam.

As described above, according to the optical amplifying system 20 and the method of monitoring amplified optical signal of the present example embodiment, it is possible to flatten the gain profile of an optical amplifier without increasing the power consumption, the cost, and the size of the optical amplifier.

A Second Example Embodiment

Next, a second example embodiment of the present invention will be described.

Figure 3:
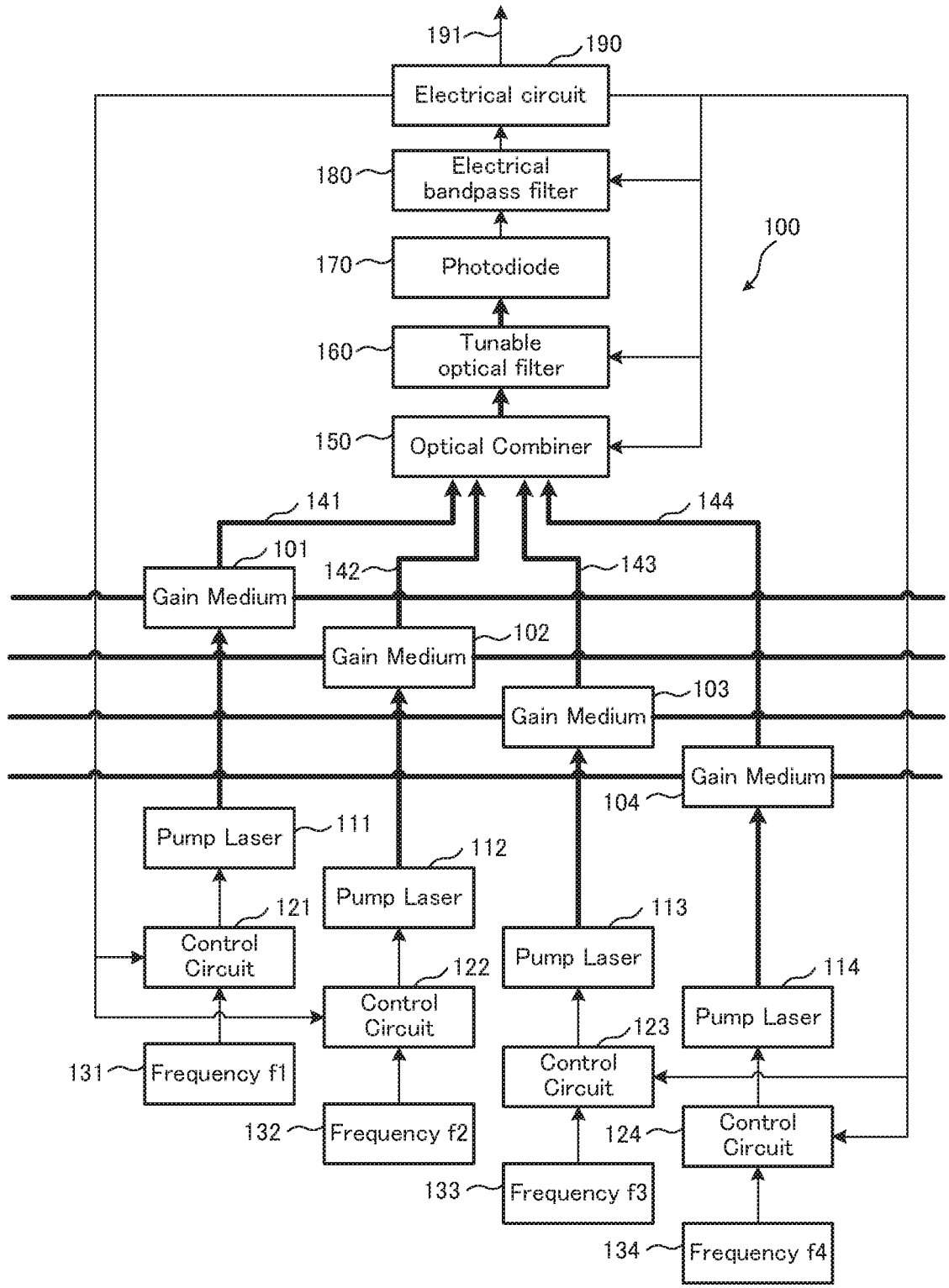
FIG. 3 is a block diagram illustrating the configuration of an optical amplifying system in accordance with a second example embodiment of the present invention.

FIG. 3 is a block diagram illustrating an optical amplifying system 100 including four optical amplifiers in accordance with the second example embodiment of the present invention. Each of the four optical amplifiers contains a gain medium 101, 102, 103, or 104. The gain medium can be made with an erbium doped fiber (EDF). Each gain medium has an input fiber and an output fiber. The input fibers may be single mode fibers.

The respective gain media 101, 102, 103, and 104 are pumped by light beams emitted by respective pump lasers 111, 112, 113, and 114. The light beams may be fed into the gain medium with WDM (wavelength division multiplexing) couplers, which can be integrated in the EDF, because the pumping light and the input signal light have different wavelengths. For instance, the input signal light can be emitted on the C-band (Conventional) around 1550 nm, whereas the EDF may be pumped in the 980 nm band.

The respective gain media 101, 102, 103, and 104 are equipped with output monitor ports, from which respective monitor light beams 141, 142, 143, and 144 are output. Additionally, the gain media may integrate isolators or pump depletion filters to remove the remaining pump light after amplification.

The monitor light beams are connected to an optical combiner 150 that has N input ports and one output port. The output port is connected to a tunable optical filter 160 (optical filtering means). The tunable optical filter 160 is a bandpass-type filter with a fixed bandwidth and tunable center wavelength. The output of the tunable optical filter 160 is converted into an electrical signal by a photodiode 170 (photoelectric conversion means). An electrical bandpass filter 180 extracts a frequency component around a frequency $f_e$. The extracted frequency component is passed to an electrical circuit 190 (spectrum information generating means). The electrical circuit 190 generates a control signal 191 relative to the extracted frequency component.

The respective pump lasers 111, 112, 113, and 114 are driven with the respective control circuits 121, 122, 123, and 124. The respective control circuits 121, 122, 123, and 124 can imprint the respective frequency components f1, f2, f3, and f4 on driving currents to modulate the light beams output from the respective pump lasers 111, 112, 113, and 114. The respective frequency components f1, f2, f3, and f4 are generated by respective clock generators 131, 132, 133, and 134.

Next, an example of the operation of the optical amplifying system 100 will be described.

The frequencies f1, f2, f3, and f4 are chosen so that each period may be longer than the response time of the EDF including the gain media 101 to 104. For instance, the frequencies of f1=1 MHz, f2=1.5 MHz, f3=2 MHz, f4=2.5 MHz are chosen. Consecutively, the respective frequency components f1, f2, f3, and f4 are imprinted on the pumping light beams, which are fed to the respective gain media 101, 102, 103, and 104. The respective frequencies components f1, f2, f3, and f4 are also imprinted on the respective output powers and consequently on the monitor light beams 141, 142, 143, and 144.

The optical combiner 150 is a 1×4 switch. At first, the 1×4 switch is set so that the monitor light beam 141 can pass toward the tunable optical filter 160. The center wavelength of the tunable optical filter is tuned so as to scan the amplification band of the gain media 101 to 104 by consecutive steps, which may be placed at distance equal to or larger than its bandwidth.

During this operation, the frequency $f_e$ of the electrical bandpass filter 180 is set at f1 by the electrical circuit 190 in order to achieve higher sensitivity and remove noise from the crosstalk occurring in the 1×4 switch 150. Consequently, the electrical circuit 190 generates a signal relative to the output of the gain medium 101 for each step of the tuning of the tunable optical filter 160. Once the scan has been completed, the electrical circuit 190 generates the control signal 191 that contains the information on the spectrum profile of the output of the gain medium 101.

Consecutively, the 1×4 switch 150 is configured by the electrical circuit 190 so that the monitor light beam 142 can pass toward the tunable optical filter 160. The frequency $f_e$ is set at $f_2$. The tunable optical filter 160 is scanned in the same manner as the above-described switch configuration. The electrical circuit 190 generates the control signal 191 that contains the information on the spectrum profile of the output of the gain medium 102.

The operation is repeated with respect to the monitor light beam 143 including the frequency component f3 so that the electrical circuit 190 can generate the control signal 191 that contains the information on the spectrum profile of the output of the gain medium 103. The operation is also repeated with respect to the monitor light beam 144 including the frequency component f4 so that the electrical circuit 190 can generate the control signal 191 that contains the information on the spectrum profile of the output of the gain medium 104.

The electrical circuit 190 may also control the output of the four pump lasers 111 to 114 through the control circuits 121 to 124.

As mentioned above, according to the optical amplifying system 100 of the present example embodiment, it is possible to obtain the information on the gain spectrum of optical amplifiers with a reduced number of devices compared to monitoring each optical amplifier separately. This makes it possible to flatten the gain profile of an optical amplifier without increasing the power consumption, the cost, and the size of the optical amplifier.

In an alternate implementation of the optical amplifying system 100, the optical combiner 150 is a 1×4 optical coupler. This makes it possible to achieve higher reliability and further cost reduction because the optical coupler is a completely passive device. Because the electrical circuit 190 can set the frequency $f_e$ of the electrical bandpass filter 180 at any one of f1, f2, f3, and f4, the generated control signal 191 can be marked with the information on the monitored gain medium among the gain media 101 to 104

In a still alternative implementation of the optical amplifying system 100, the frequencies f1, f2, f3, and f4 are all the same and imprinted one at a time in time division manner. The electrical bandpass filter 180 has a fixed bandpass frequency. The information on the monitored optical amplifier is obtained by controlling the pump laser that is modulated.

In an alternative implementation of the optical amplifying system 100, the frequencies f1, f2, f3, and f4 are not imprinted by the control circuits 121, 122, 123, and 124. In this regard, the clock generators 131, 132, 133, and 134 as well as the electrical bandpass filter can be removed from the optical amplifying system 100 in order to reduce costs. Because the electrical circuit 190 has the information on the configuration of the 1×4 switch, the generated control signal 191 can be marked with the information on the monitored gain medium among the gain media 101 to 104 according to the above operation.

The optical amplifying system 100 can be generalized so as to include N optical amplifiers, where FIG. 3 illustrates a representative example with N=4. In this regard, N frequencies may be chosen to modulate N pump lasers, and the optical combiner 150 has N inputs for one output.

Figure 4:
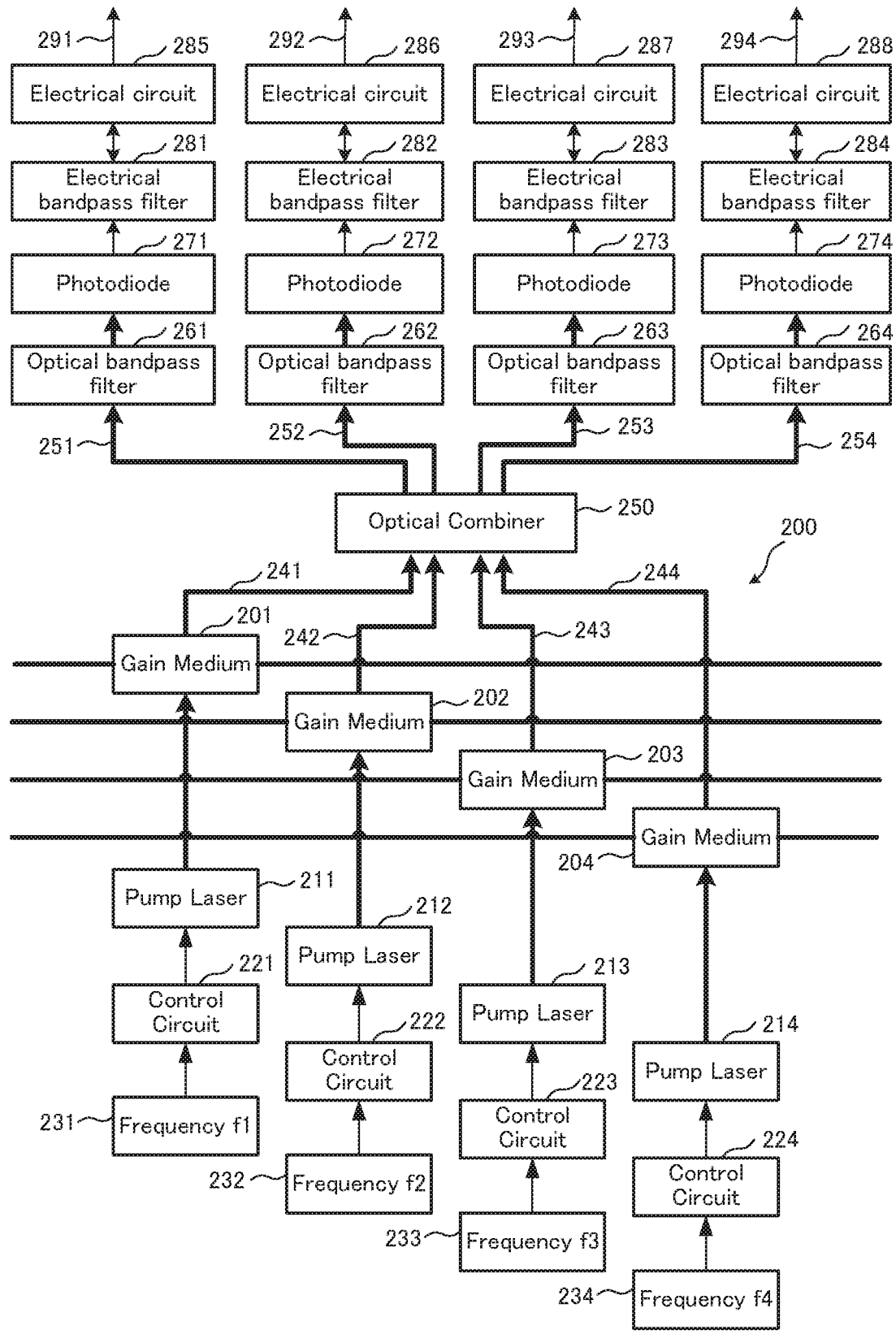
FIG. 4 is a block diagram illustrating another configuration of the optical amplifying system in accordance with the second example embodiment of the present invention.

FIG. 4 is a block diagram illustrating another configuration of the optical amplifying system in accordance with the present example embodiment.

The optical amplifying system 200 includes four optical amplifiers. Four gain media 201, 202, 203, and 204 are similar to the respective gain media 101, 102, 103, and 104 in FIG. 3. Four pump lasers 211, 212, 213, and 214 are similar to the respective pump lasers 111, 112, 113, and 114 in FIG. 3. Four control circuits 221, 222, 223, and 224 are similar to the respective control circuits 121, 122, 123, and 124 in FIG. 3. Four clock generators 231, 232, 233, and 234 are similar to the respective clock generators 131, 132, 133, and 134 in FIG. 3.

The gain media 201, 202, 203, and 204 output respective monitor light beams 241, 242, 243, and 244. The monitor light beams are fed to an optical combiner 250, which receives input of four monitor light beams and outputs four light beams 251, 252, 253, and 254.

Each of the light beams 251 to 254 is provided for one of optical bandpass filters 261, 262, 263, and 264. Each optical bandpass filter has a fixed center wavelength and a fixed bandwidth. Such optical bandpass filter enables low cost and small footprint. For instance, each bandwidth of the optical bandpass filters may be equal to one fourth of the amplification bandwidth, and their center wavelengths are spaced at intervals equal to their bandwidth in order to cover the whole amplification bandwidth. To reduce further the costs and make the footprint even smaller, the four optical bandpass filters may be integrated in an arrayed waveguide device.

Each of four photodiodes 271, 272, 273, and 274 is similar to the photodiode 170 in FIG. 3. Each of four electrical bandpass filters 281, 282, 283, and 284 is similar to the electrical bandpass filter 180 in FIG. 3. Each of four electrical circuits 285, 286, 287, and 288 is similar to the electrical circuit 190 in FIG. 3. Each of four control signals 291, 292, 293, and 294 is similar to the control signal 191 in FIG. 3.

In an implementation of the optical amplifying system 200, the optical combiner 250 is a 4×4 optical coupler. Each output of the 4×4 optical coupler contains one fourth of each inputted monitor light beam.

The frequencies f1, f2, f3, and f4 are chosen so that each period may be longer than the response time of the EDF including the gain media 201 to 204. The respective frequency components f1, f2, f3, and f4 are imprinted on the pumping light beams, which are fed to the respective gain media 201, 202, 203, and 204. The respective frequencies components f1, f2, f3, and f4 are also be imprinted on the respective output powers and consequently on the monitor light beams 241, 242, 243, and 244.

The frequency $f_{e,1}$ of the electrical bandpass filter 281 is set at f1 by the electrical circuit 285. Consequently, the electrical circuit 285 generates a signal relative to the output of the gain medium 201 with respect to the optical passband of the optical bandpass filter 261. Then the frequency $f_{e,1}$ is set at $f_2$. Consequently, the electrical circuit 285 generates a signal relative to the output of the gain medium 202 with respect to the optical passband of the optical bandpass filter 261. And then the frequency $f_{e,1}$ is set at $f_3$. Consequently, the electrical circuit 285 generates a signal relative to the output of the gain medium 203 with respect to the optical passband of the optical bandpass filter 261. Finally, the frequency $f_{e,1}$ is set at $f_4$. Consequently, the electrical circuit 285 generates a signal relative to the output of the gain medium 204 with respect to the optical passband of the optical bandpass filter 261.

In the same manner, the electrical circuit 286 generates the control signal 292 that contains the information on the output of the gain media 201, 202, 203, and 204 with respect to the optical passband of the optical bandpass filter 262. The electrical circuit 287 generates the control signal 293 that contains the information on the output of the gain media 201, 202, 203, and 204 with respect to the optical passband of the optical bandpass filter 263. The electrical circuit 288 generates the control signal 294 that contains the information on the output of the gain media 201, 202, 203, and 204 with respect to the optical passband of the optical bandpass filter 264.

As a result of the above operation, the control signals 291, 292, 293, and 294 contain the information on the outputs of the gain media 201, 202, 203, and 204 with respect to the decomposed optical passbands of the optical bandpass filters 261, 262, 263, and 264. Therefore, the information to equalize each gain of the EDFs including gain media 201 to 204 can be obtained from the control signals 291 to 294. The number of required optical bandpass filters, photodiodes, and electrical bandpass filters is reduced to one fourth compared to the case where each of the EDFs including gain media 201 to 204 is monitored in the same manner. This enables the size and costs of the optical amplifying system 200 to be reduced.

The number of optical bandpass filters is not limited to four. More optical bandpass filters than four can be used, which makes it possible to obtain higher spectral resolution for the information on the gain profile of the optical amplifier.

Figure 5:
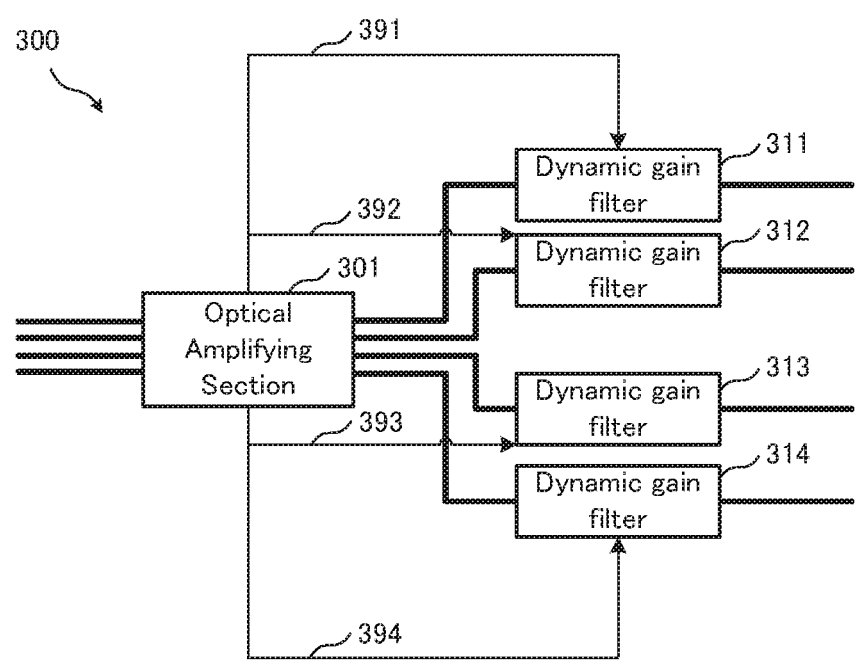
FIG. 5 is a block diagram illustrating yet another configuration of the optical amplifying system in accordance with the second example embodiment of the present invention.

FIG. 5 is a block diagram illustrating yet another configuration of the optical amplifying system in accordance with the present example embodiment.

The optical amplifying system 300 further includes four dynamic gain filters 311, 312, 313, and 314 (gain filtering means) in addition to an optical amplifying section 301 (optical amplifying means). The optical amplifying section 301 includes four optical amplifiers and may be similar to the optical amplifying system 100 or the optical amplifying system 200.

The dynamic gain filters 311, 312, 313, and 314 may be similar to the tunable equalizing filter reported in NPL4. The dynamic gain filters 311, 312, 313, and 314 are controlled by respective control signals 391, 392, 393, and 394 provided by the optical amplifying section 301. Each of the control signals 391 to 394 may be similar to the control signal 191 in FIG. 3. In this case, the dynamic gain filter 311 is controlled according to the information on the gain medium 101 in the EDF that is included in the control signal 391. Identically, each of the dynamic gain filters 312, 313, and 314 is controlled according to the information on the gain medium 102, 103, or 104 in each EDF that is included in the control signal 392, 393, or 394.

In this manner, the dynamic gain filter equalizes the gain profile of the optical amplifier with small footprint and reduced cost. This makes it possible to control the optical amplifier including the EDF dynamically without loading the ASE onto the optical signal and reduce the power consumption of the optical amplifier.

Alternatively, each of the control signals 391 to 394 may be similar to the concatenation of the control signals 291 to 294 in FIG. 4. In this case, the dynamic gain filter 311 is controlled according to the information on the gain medium 201 in the EDF that is included in the control signals 291 to 294. Identically, each of the respective dynamic gain filters 312, 313, and 314 is controlled according to the information on the gain medium 202, 203, or 204 in each EDF that is included in the control signals 291 to 294.

In this manner, the dynamic gain filter equalizes the gain profile of the optical amplifier with small footprint and reduced cost. Again, this makes it possible to control the optical amplifier including the EDF dynamically without loading the ASE onto the optical signal and reduce the power consumption of the optical amplifier.

A Third Example Embodiment

Next, a third example embodiment of the present invention will be described.

Figure 6:
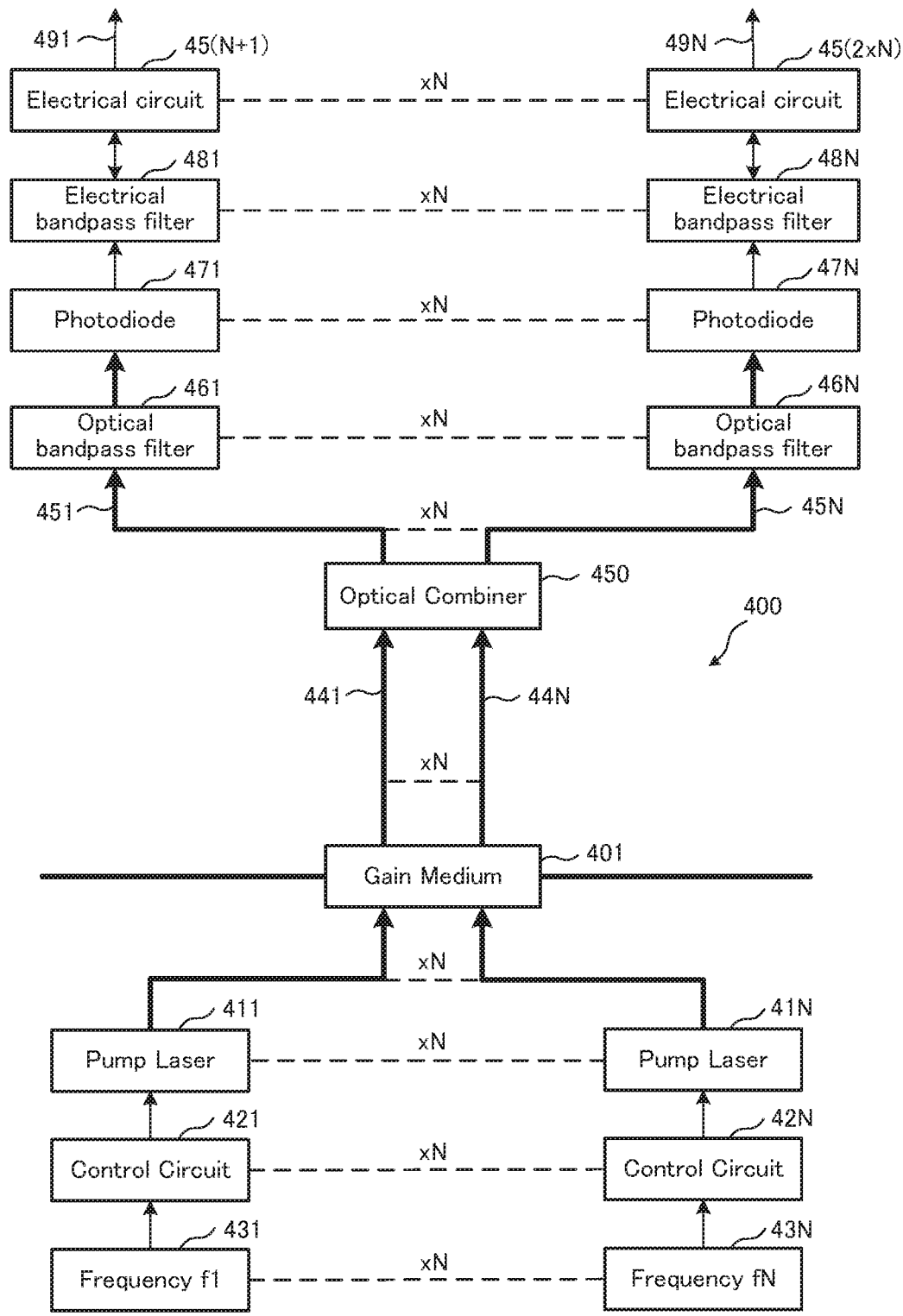
FIG. 6 is a block diagram illustrating the configuration of an optical amplifying system in accordance with a third example embodiment of the present invention.

FIG. 6 is a block diagram illustrating an optical amplifying system 400 including a multicore fiber amplifier in accordance with a third example embodiment of the present invention. A gain medium 401 is included in a multicore erbium doped fiber (MC-EDF) with N cores. The MC-EDF is connected to an input MCF (multicore fiber) with N cores and an output MCF with N cores.

Each core in the MC-EDF is pumped directly by a pump laser similar to the pump laser 111 in FIG. 3. The N pump lasers are denoted with the numerals 411 to 41N. Each of the pump lasers is driven with a control circuit similar to the control circuit 121 in FIG. 3. The N control circuits are denoted with the numerals 421 to 42N. Each of the control circuits is connected to a clock generator similar to the clock generator 131 in FIG. 3. The N clock generators with respective frequencies f1 to fN are denoted with the numerals 431 to 43N.

The MC-EDF including the gain medium 401 has N output monitor ports, corresponding to N cores, from which respective monitor light beams 441 to 44N are output. The monitor light beams 441 to 44N are connected to an optical combiner 450 that has N inputs and N outputs. The optical combiner 450 outputs light beams 451 to 45N.

Each of the light beams 451 to 45N is connected to an optical bandpass filter, which is similar to the optical bandpass filter 261 in FIG. 4. The N optical bandpass filters are denoted with the numerals 461 to 46N. Each of the optical bandpass filters is connected to a photodiode, which is similar to the photodiode 170 in FIG. 3. The N photodiodes are denoted with the numerals 471 to 47N. Each of photodiodes is connected to an electrical bandpass filter, which is similar to the electrical bandpass filter 180 in FIG. 3. The N electrical bandpass filters are denoted with the numerals 481 to 48N. Each of the electrical filter is connected to an electrical circuit, which is similar to the electrical circuit 190 in FIG. 3. The N electrical circuits are denoted with the numerals 45(N+1) to 45(2×N). Each of electrical circuits generates a control signal, which is similar to the control signal 291 in FIG. 4. The N control signals are denoted with the numerals 491 to 49N.

The operation of the optical amplifying system 400 is similar to the operation of the optical amplifying system 200. As is the case with the optical amplifying system 200, according to the optical amplifying system 400, it is possible to flatten the gain profile of the optical amplifier without increasing the power consumption, the cost, and the size of the optical amplifier.

In addition to the benefits of small size and low cost, according to the optical amplifying system 400 using the MC-EDF including a large number of cores, it is possible to obtain high spectral resolution for the information on the gain profile of the optical amplifier, because the monitored spectrum band can be divided into N smaller sub-bands by the N optical bandpass filters 461 to 46N. The number of optical bandpass filters is not limited to N. M optical bandpass filters, where M is larger than N, can be used, which makes it possible to obtain much higher spectral resolution.

Figure 7:
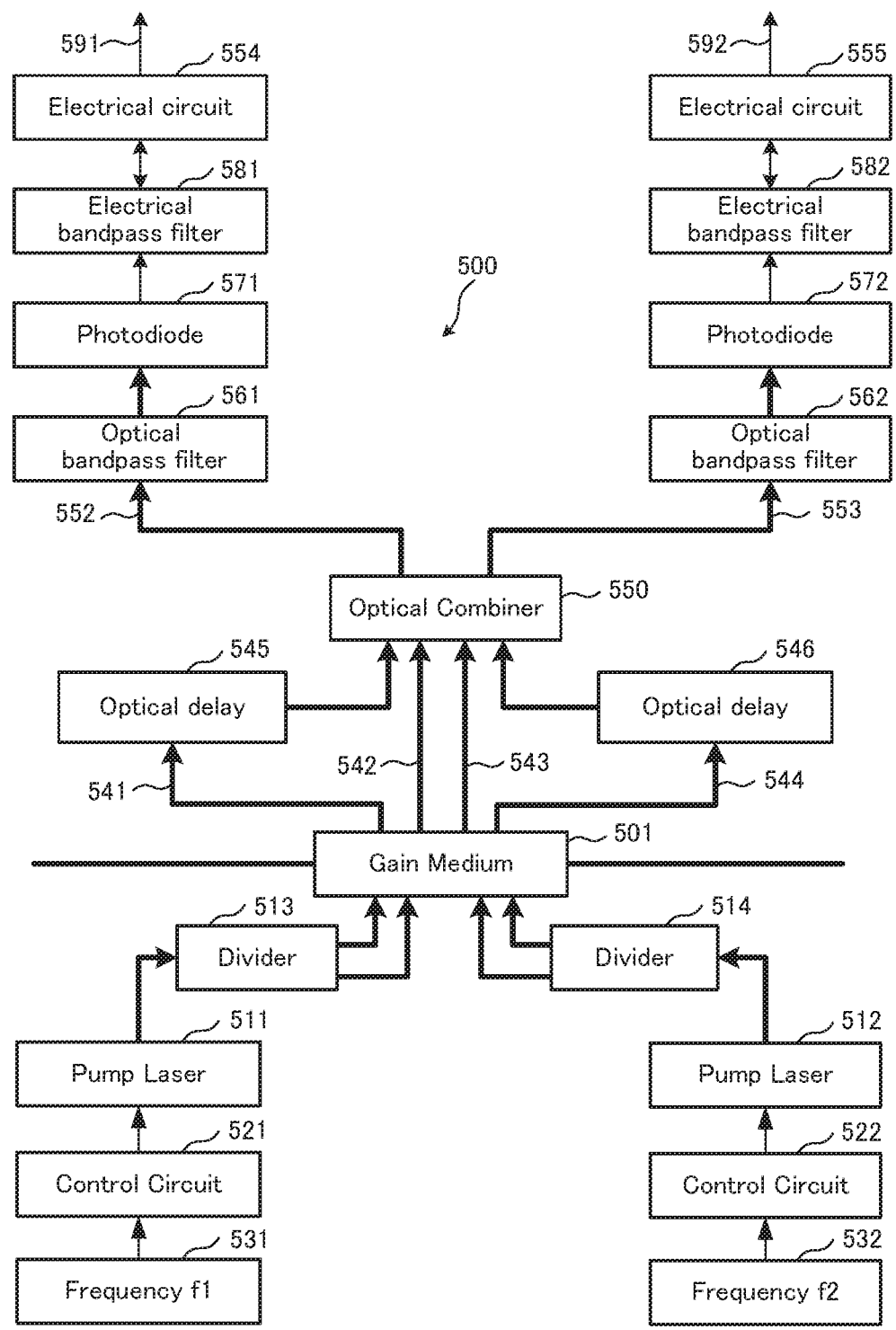
FIG. 7 is a block diagram illustrating another configuration of the optical amplifying system in accordance with the third example embodiment of the present invention.

FIG. 7 is a block diagram illustrating another configuration of the optical amplifying system in accordance with the present example embodiment.

The optical amplifying system 500 includes a gain medium 501 in an MC-EDF that has four cores and may be similar to the MC-EDF for N=4 in FIG. 6. The four cores are pumped by two pump lasers 511 and 512, which are similar to the pump laser 411 in FIG. 6. The respective pump lasers 511 and 512 are driven by respective control circuits 521 and 522, which are similar to the control circuit 421 in FIG. 6. The respective control circuits 521 and 522 are connected to respective clock generators 531 and 532, which are similar to the clock generator 431 in FIG. 6.

The four cores in the MC-EDF are pumped by the two pump lasers 511 and 512 using the shared core pumping technique described in NPL3. This is achieved by dividers 513 and 514, which can be composed of 1×2 optical couplers.

Monitor light beams 541, 542, 543, and 544 output from the gain medium 501 are combined by an optical combiner 550, which may be composed of a 2×2 coupler. The monitor light beams 541 and 544 are delayed by optical delays 545 and 546 respectively. The optical delay may be composed of a fiber coil.

Optical bandpass filters 561 and 562 are similar to the optical bandpass filter 461 in FIG. 6. Photodiodes 571 and 572 are similar to the photodiode 471 in FIG. 6. Electrical bandpass filters 581 and 582 are similar to the electrical bandpass filter 481 in FIG. 6. Electrical circuits 554 and 555 generate control signals 591 and 592 that contain the information on the gain shape of the four cores of the gain medium 501.

Next, an example of the operation of the optical amplifying system 500 will be described. The optical delay 545 delays the monitor light beam 541 by one quarter of the period of the frequency f1 compared to the monitor light beam 542. Similarly, the optical delay 546 delays the monitor light beam 544 by one quarter of the period of the frequency f2 compared to the monitor light beam 543.

The electrical circuit 554 recovers the information in phase and in quaternary phase respectively with respect to the frequency f1 after passing through the optical bandpass filter. The separation into in phase and quaternary phase recovers the respective information on the individual cores monitored by the monitor light beams 541 and 542 respectively, whereas the monitor light beams 541 and 542 are generated by the same pump laser 511 modulated with the same frequency f1 The same process is used with respect to the frequency f2 by the electrical circuit 555 in order to recover the information on both cores that are pumped by the same pump laser 512 modulated with the same frequency f2. The electrical circuit 555 operates in the same manner.

As a result of the above operation, the control signals 591 and 592 contain the information on the outputs of the cores in the MC-EDF with respect to the decomposed optical passbands of the optical bandpass filters 561 and 562. Therefore, the information to equalize each gain of the cores in the MC-EDF can be obtained from the control signals 591 and 592.

According to the optical amplifying system 500, the number of required optical bandpass filters, photodiodes, and electrical bandpass filters is even reduced by a factor two compared to the optical amplifying system 200 described in FIG. 4.

Alternatively, the optical delays 545 and 546 may delay the monitor light beam by a smaller time difference, which enables the size to be reduced. If the decomposition into in phase and quaternary phase is used, the information on each of the monitored cores will be retrieved through the decomposition on the orthogonal base.

Figure 8:
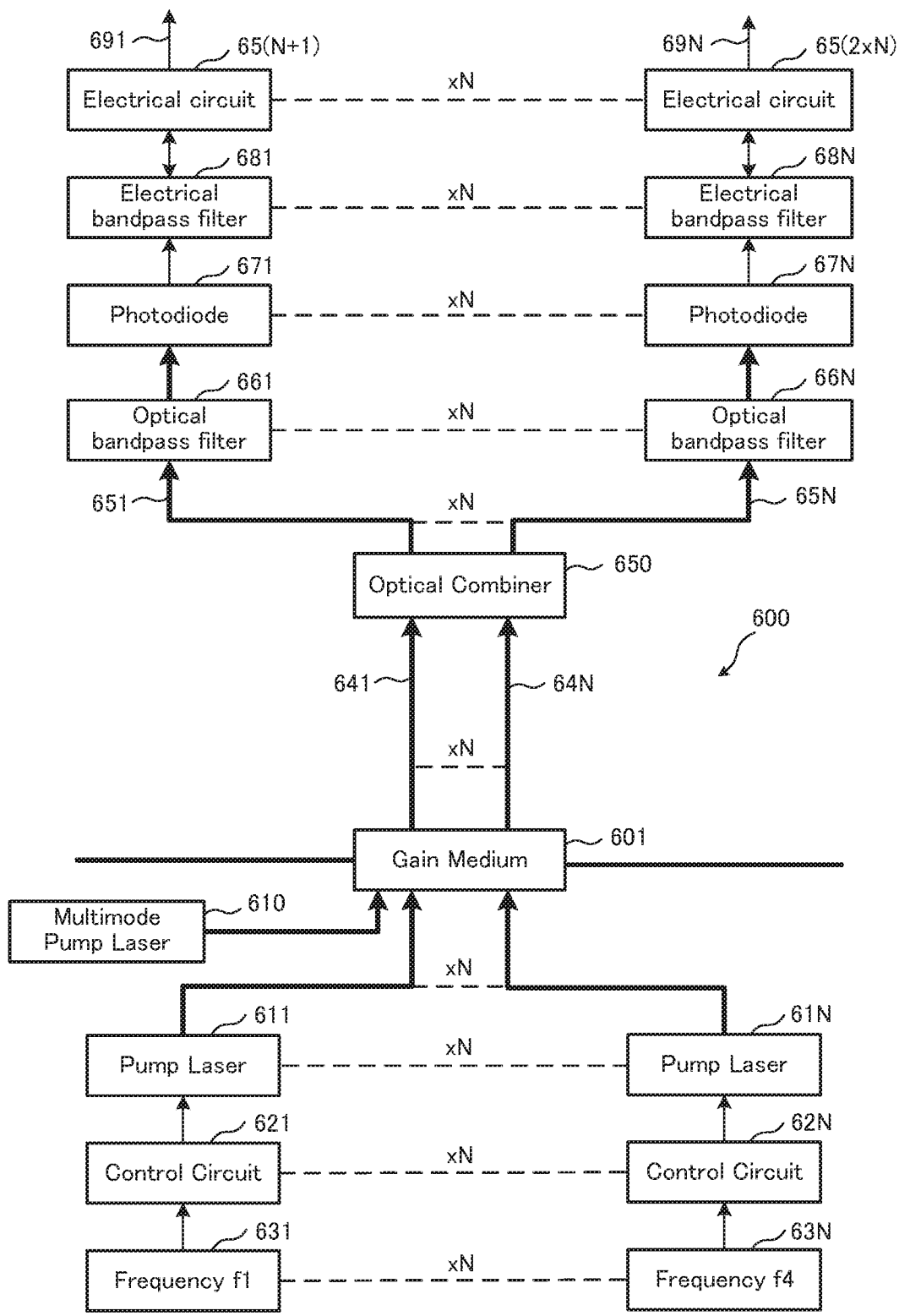
FIG. 8 is a block diagram illustrating yet another configuration of the optical amplifying system in accordance with the third example embodiment of the present invention.

FIG. 8 is a block diagram illustrating yet another configuration of the optical amplifying system in accordance with the present example embodiment.

The optical amplifying system 600 includes a multicore fiber amplifier. A gain medium 601 is identical to the gain medium 401 in the MC-EDF. The cores are pumped directly and individually with N pump lasers 611 to 61N, which are similar to the pump lasers 411 to 41N. The pump lasers are driven by N control circuits 621 to 62N, which are similar to the control circuits 421 to 42N. The control circuits 621 to 62N are connected to N clock generators 631 to 63N, which are similar to the clock generators 431 to 43N.

The MC-EDF including the gain medium 601 has N output monitor ports from which monitor light beams 641 to 64N similar to the monitor light beams 441 to 44N are output. The monitor light beams 641 to 64N are connected to the optical combiner 650, which is similar to the optical combiner 450. The N optical bandpass filters 661 to 66N are similar to the optical bandpass filters 461 to 46N. N photodiodes 671 to 67N are similar to the photodiodes 471 to 47N. N electrical bandpass filters 681 to 68N are similar to the electrical bandpass filters 481 to 48N. The N electrical circuits 65(N+1) to 65(2N) are similar to the electrical circuits 45(N+1) to 45(2×N). The N control signals 691 to 69N are similar to the control signals 491 to 49N.

The optical amplifying system 600 further includes a multimode pump laser 610 that is used for cladding pump in a hybrid manner as illustrated in NPL2. Most of the pump power is provided by the multimode pump laser 610, which makes it possible to reduce the power consumption of the optical amplifying system 600. The pump lasers 611 to 61N provide marginal pump power, but they are capable of imprinting N frequency components f1 to fN on the output signals of the N cores of the gain medium 601. In this manner, the MC-EDF in the optical amplifying system 600 can be operated with reduced power consumption while the information on the gain shape can be monitored with the control signals 691 to 69N.

Figure 9:
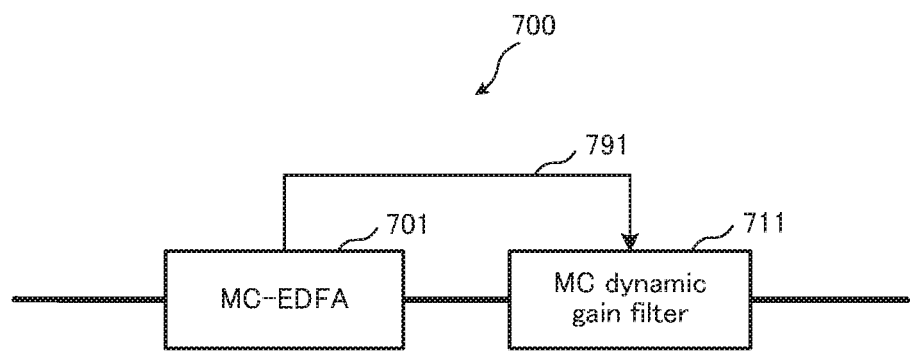
FIG. 9 is a block diagram illustrating yet another configuration of the optical amplifying system in accordance with the third example embodiment of the present invention.

FIG. 9 is a block diagram illustrating yet another configuration of the optical amplifying system in accordance with the present example embodiment.

The optical amplifying system 700 includes a MC-EDFA (Multi Core Erbium Doped Fiber Amplifier) 701 and a multicore dynamic gain filter 711. The number of cores in the MC-EDFA 701 is equal to the number of the multicore dynamic gain filters as well as the number of cores of a multicore fiber that connects the MC-EDFA 701 and the multicore dynamic gain filter 711. The MC-EDFA 701 may be similar to the optical amplifying system 400, 500 or 600.

The multicore dynamic gain filter 711 adjusts the gain shape of each core in order to equalize the gain of each core in the MC-EDFA 701. The multicore dynamic gain filter 711 is controlled by a control signal 791, which is similar to the concatenation of the control signals 491 to 49N in FIG. 6. Alternatively, the control signal 791 is similar to the concatenation of the control signals 591 and 592 in FIG. 7. Alternatively, the control signal 791 is similar to the concatenation of the control signals 691 to 69N in FIG. 8.

The multicore dynamic gain filter 711 is controlled according to the information on the gain profile of the MC-EDFA 701 that is contained in the control signal 791. In this manner, the multicore dynamic gain filter 711 equalizes the gain profile of the cores of the MC-EDFA 701 with small footprint and reduced cost. Again, this makes it possible to control the optical amplifier including the EDF dynamically without loading the ASE onto the optical signal and reduce the power consumption of the optical amplifier.

The whole or part of the example embodiments disclosed above can be described as, but not limited to, the following supplementary notes.

(Supplementary note 1) A monitoring apparatus for optical amplifier, comprising: an optical filtering means for receiving a monitor light beam of the optical amplifier and transmitting a filtered monitor light beam with a set range of wavelength band; a photoelectric conversion means for converting the filtered monitor light beam into a monitoring signal; and a spectrum information generating means for generating spectrum information based on the monitoring signal, the spectrum information including information on a spectrum profile of output of the optical amplifier.

(Supplementary note 2) The monitoring apparatus for optical amplifier according to Supplementary note 1, wherein the optical filtering means includes a tunable optical filter whose center wavelength is tunable, and the spectrum information generating means generates the spectrum information by scanning the center wavelength.

(Supplementary note 3) The monitoring apparatus for optical amplifier according to Supplementary note 1, wherein the optical filtering means includes a plurality of optical bandpass filters, each of which has a different fixed center wavelength and a fixed passband, and transmits the filtered monitor light beam with respect to each passband, the photoelectric conversion means includes a plurality of photodetectors, each of which converts the filtered monitor light beam with respect to each passband into the monitoring signal with respect to each passband, and the spectrum information generating means generates the spectrum information based on the monitoring signal with respect to each passband.

(Supplementary note 4) The monitoring apparatus for optical amplifier according to any one of Supplementary notes 1, 2, and 3, further comprising an optical combining means for receiving a plurality of monitor light beams from the optical amplifier and transmitting the monitor light beam to the optical filtering means.

(Supplementary note 5) An optical amplifying system, comprising:

a monitoring means; and an optical amplifying means, wherein the monitoring means includes an optical filtering means for receiving a monitor light beam of the optical amplifying means and transmitting a filtered monitor light beam with a set range of wavelength band; a photoelectric conversion means for converting the filtered monitor light beam into a monitoring signal; and a spectrum information generating means for generating spectrum information based on the monitoring signal, the spectrum information including information on a spectrum profile of output of the optical amplifying means.

(Supplementary note 6) The optical amplifying system according to Supplementary note 5, further comprising a gain filtering means for equalizing the spectrum profile based on the spectrum information.

(Supplementary note 7) The optical amplifying system according to Supplementary note 5 or 6, wherein the optical filtering means includes a tunable optical filter whose center wavelength is tunable, and the spectrum information generating means generates the spectrum information by scanning the center wavelength.

(Supplementary note 8) The optical amplifying system according to Supplementary note 5 or 6, wherein the optical filtering means includes a plurality of optical bandpass filters, each of which has a different fixed center wavelength and a fixed passband, and transmits the filtered monitor light beam with respect to each passband, the photoelectric conversion means includes a plurality of photodetectors, each of which converts the filtered monitor light beam with respect to each passband into the monitoring signal with respect to each passband, and the spectrum information generating means generates the spectrum information based on the monitoring signal with respect to each passband.

(Supplementary note 9) The optical amplifying system according to any one of Supplementary notes 5, 6, 7, and 8, wherein the monitoring means further includes an optical combining means for receiving a plurality of monitor light beams from the optical amplifying means and transmitting the monitor light beam to the optical filtering means.

(Supplementary note 10) The optical amplifying system according to Supplementary note 7, wherein the monitoring means further includes an optical combining means, the optical amplifying means includes a plurality of gain media, and the optical combining means receives a plurality of monitor light beams from the plurality of gain media and transmits one of the plurality of monitor light beams to the tunable optical filter.

(Supplementary note 11) The optical amplifying system according to Supplementary note 10, wherein the optical combining means includes one of an optical switch and an optical coupler.

(Supplementary note 12) The optical amplifying system according to Supplementary note 10 or 11, wherein the monitoring means further includes an electrical bandpass filter, each of the plurality of gain media is pumped by a pumping light beam to which a frequency component is added, each of the plurality of monitor light beams has the frequency component, and the electrical bandpass filter extracts the monitoring signal having the frequency component.

(Supplementary note 13) The optical amplifying system according to Supplementary note 8, wherein the monitoring means further includes an optical combining means, the optical amplifying means includes a plurality of gain media, and the optical combining means receives a plurality of monitor light beams from the plurality of gain media and transmits each of the plurality of monitor light beams to each of the plurality of optical bandpass filters.

(Supplementary note 14) The optical amplifying system according to Supplementary note 13, wherein the optical combining means includes an optical coupler having input ports and output ports, and the number of output ports is not less than the number of input ports.

(Supplementary note 15) The optical amplifying system according to Supplementary note 13 or 14, wherein the monitoring means further includes a plurality of electrical bandpass filter, each of the plurality of gain media is pumped by a pumping light beam to which a frequency component is added, each of the plurality of monitor light beams has the frequency component, and the electrical bandpass filter extracts the monitoring signal having the frequency component with respect to each passband.

(Supplementary note 16) The optical amplifying system according to Supplementary note 15, wherein the monitoring means further includes an optical delay means for delaying one of the plurality of monitor light beams having same frequency component, and the spectrum information generating means generates the spectrum information based on the monitoring signal that is recovered by separating the plurality of monitor light beams having same frequency component.

(Supplementary note 17) The optical amplifying system according to any one of Supplementary notes 13, 14, 15, and 16, each of the plurality of gain media is included in each core of a multicore fiber.

(Supplementary note 18) The optical amplifying system according to Supplementary note 17, further comprising a multimode pump laser configured to pump a cladding layer of the multicore fiber.

(Supplementary note 19) A method of monitoring amplified optical signal, comprising: obtaining a monitor light beam being part of the amplified optical signal and generating a filtered monitor light beam with a set range of wavelength band; converting the filtered monitor light beam into a monitoring signal; and generating spectrum information based on the monitoring signal, the spectrum information including information on a spectrum profile of the amplified optical signal.

(Supplementary note 20) The method of monitoring amplified optical signal according to Supplementary note 19, wherein the generating of the spectrum information includes scanning a center wavelength of the wavelength band.

(Supplementary note 21) The method of monitoring amplified optical signal according to Supplementary note 19, wherein the generating of the filtered monitor light beam includes generating a plurality of filtered monitor light beams each of which having a different center wavelength and a passband, the converting of the filtered monitor light beam includes converting each of the plurality of filtered monitor light beams into the monitoring signal with respect to each passband, and the generating of the spectrum information includes generating the spectrum information based on the monitoring signal with respect to each passband.

(Supplementary note 22) The method of monitoring amplified optical signal according to any one of Supplementary notes 19, 20, and 21, further comprising combining a plurality of monitor light beams being part of the amplified optical signal and generating the monitor light beam.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 10 monitoring apparatus for optical amplifier
11 optical filtering means
12 photoelectric conversion means
13 spectrum information generating means
20, 100, 200, 300, 400, 500, 600, 700 optical amplifying system
21 monitoring means
22 optical amplifying means
23 gain filtering means
90 monitor light beam
101, 102, 103, 104, 201, 202, 203, 204, 401, 501, 601 gain medium
111, 112, 113, 114, 211, 212, 213, 214, 411 ... 41N, 511, 512, 611 ... 61N pump laser
121, 122, 123, 124, 221, 222, 223, 224, 421 ... 42N, 521, 522, 621 ... 62N control circuit
131, 132, 133, 134, 231, 232, 233, 234, 431 ... 43N, 531, 532, 631 ... 63N clock generator
141, 142, 143, 144, 241, 242, 243, 244, 441 ... 44N, 541, 542, 543, 544,
641 ... 64N monitor light beam
150, 450, 550, 650 optical combiner
160 tunable optical filter
170, 271, 272, 273, 274, 471 ... 47N, 571, 572, 671 ... 67N photodiode
180, 281, 282, 283, 284, 481 ... 48N, 581, 582, 681 ... 68N electrical bandpass filter
190, 285, 286, 287, 288, 45(N+1) ... 45(2×N), 554, 555, 65(N+1) ... 65(2N) electrical circuit
191, 291, 292, 293, 294, 391, 392, 393, 394, 491 ... 49N, 591, 592,
691 ... 69N control signal
251, 252, 253, 254, 451 ... 45N light beam
261, 262, 263, 264, 461 ... 46N, 561, 562, 661 ... 66N optical bandpass filter
301 optical amplifying section
311, 312, 313, 314 dynamic gain filter
513, 514 divider
545, 546 optical delays
610 multimode pump laser
701 MC-EDFA
711 multicore dynamic gain filter

The invention claimed is:

1. A monitoring apparatus for optical amplifier, comprising:
an optical filter configured to receive a monitor light beam of the optical amplifier and transmit a filtered monitor light beam within a set wavelength band;
a photoelectric converter configured to convert the filtered monitor light beam into a monitoring signal;
a circuit configured to generate spectrum information based on the monitoring signal, the spectrum information including information on a spectrum profile of output of the optical amplifier; and
an optical combiner configured to receive a plurality of output monitor light beams from the optical amplifier and transmit to the optical filter a selected one of the output monitor light beams as the monitor light beam, wherein
the optical filter includes a plurality of optical bandpass filters that each have a different fixed center wavelength and a fixed passband that each transmit the filtered monitor light beam with respect to the fixed passband,
the photoelectric converter includes a plurality of photodetectors that each convert the filtered monitor light beam with respect to the fixed passband of a corresponding optical bandpass filter into the monitoring signal with respect to the fixed passband of the corresponding optical bandpass filter, and
the circuit generates the spectrum information based on the monitoring signal with respect to the fixed passband of each optical bandpass filter.

2. An optical amplifying system comprising:
a monitoring apparatus; and
an optical amplifier,
wherein the monitoring apparatus includes:
- an optical filter configured to receive a monitor light beam of the optical amplifier and transmit a filtered monitor light beam within a set wavelength band;
- a photoelectric converter configured to convert the filtered monitor light beam into a monitoring signal; and
- a circuit configured to generate spectrum information based on the monitoring signal, the spectrum information including information on a spectrum profile of output of the optical amplifier; and
- an optical combiner configured to receive a plurality of output monitor light beams from the optical amplifier and transmit to the optical filter a selected one of the output monitor light beams as the monitor light beam, wherein the optical filter includes a plurality of optical bandpass filters that each have a different fixed center wavelength and a fixed passband that each transmit the filtered monitor light beam with respect to the fixed passband,
the photoelectric converter includes a plurality of photodetectors that each convert the filtered monitor light beam with respect to the fixed passband of a corresponding optical bandpass filter into the monitoring signal with respect to the fixed passband of the corresponding optical bandpass filter, and
the circuit generates the spectrum information based on the monitoring signal with respect to the fixed passband of each optical bandpass filter.

3. The optical amplifying system according to claim 2, further comprising a gain filter configured to equalize the spectrum profile based on the spectrum information.

4. The optical amplifying system according to claim 2,
wherein the optical filter includes a tunable optical filter having a center wavelength that is tunable, and
the circuit generates the spectrum information by scanning the center wavelength.

5. The optical amplifying system according to claim 4, wherein
the optical amplifier includes a plurality of gain media, and
the optical combiner receives the plurality of output monitor light beams from the plurality of gain media and transmits to the tunable optical filter the one of the plurality of output monitor light beams as the monitor light beam.

6. The optical amplifying system according to claim 5, wherein the optical combiner includes one of an optical switch and an optical coupler.

7. The optical amplifying system according to claim 5,
wherein the monitoring apparatus further includes an electrical bandpass filter,
each of the plurality of gain media is pumped by a pumping light beam to which a frequency component is added,
each of the plurality of output monitor light beams has the frequency component, and
the electrical bandpass filter extracts the monitoring signal having the frequency component.

8. The optical amplifying system according to claim 2,
the optical amplifier includes a plurality of gain media, and
the optical combiner receives the plurality of output monitor light beams from the plurality of gain media and respectively transmits the plurality of monitor light beams to the plurality of optical bandpass filters.

9. The optical amplifying system according to claim 8,
wherein the optical combiner includes an optical coupler having input ports and output ports, and
a number of output ports is not less than a number of input ports.

10. The optical amplifying system according to claim 8,
wherein the monitoring apparatus further includes a plurality of electrical bandpass filters,
each of the plurality of gain media is pumped by a pumping light beam to which a frequency component is added,
each of the plurality of output monitor light beams has the frequency component, and
each of the plurality of electrical bandpass filters extracts the monitoring signal having the frequency component with respect to the fixed passband of the corresponding optical bandpass filter.

11. The optical amplifying system according to claim 10,
wherein the monitoring apparatus further includes an optical delay configured to delay one of the plurality of monitor light beams having a same frequency component, and
the circuit generates the spectrum information based on the monitoring signal that is recovered by separating the plurality of monitor light beams having the same frequency component.

12. The optical amplifying system according to claim 8,
each of the plurality of gain media is included in a corresponding core of a multicore fiber.

13. The optical amplifying system according to claim 12, further comprising a multimode pump laser configured to pump a cladding layer of the multicore fiber.

14. A method of monitoring amplified optical signal, comprising:
receiving, by an optical filter, a monitor light beam of the optical amplifier, and transmitting a filtered monitor light beam within a set wavelength band;
converting, by a photoelectric converter, the filtered monitor light beam into a monitoring signal;
generating, by a circuit, spectrum information based on the monitoring signal, the spectrum information including information on a spectrum profile of output of the optical amplifier;
receiving, by an optical combiner, a plurality of output monitor light beams from the optical amplifier and transmitting, by the optical combiner, to the optical filter a selected one of the output monitor light beams as the monitor light beam, wherein the optical filter includes a plurality of optical bandpass filters that each have a different fixed center wavelength and a fixed passband that each transmit the filtered monitor light beam with respect to the fixed passband,
the photoelectric converter includes a plurality of photodetectors that each convert the filtered monitor light beam with respect to the fixed passband of a corresponding optical bandpass filter into the monitoring signal with respect to the fixed passband of the corresponding optical bandpass filter, and
the circuit generates the spectrum information based on the monitoring signal with respect to the fixed passband of each optical bandpass filter.

15. The method of monitoring amplified optical signal according to claim 14,
wherein the generating of the spectrum information includes scanning a center wavelength of the wavelength band.

* * * * *